United States Patent
Kallgren

[11] Patent Number: 6,064,680
[45] Date of Patent: May 16, 2000

[54] ATTENUATION-FREE OPTICAL CONNECTION

[75] Inventor: Dan Kallgren, Stockholm, Sweden

[73] Assignee: Telia A.B., Farsta, Sweden

[21] Appl. No.: 08/894,375

[22] PCT Filed: Feb. 20, 1996

[86] PCT No.: PCT/SE96/00225

§ 371 Date: Jan. 20, 1998

§ 102(e) Date: Jan. 20, 1998

[87] PCT Pub. No.: WO96/26581

PCT Pub. Date: Aug. 29, 1996

[30] Foreign Application Priority Data

Feb. 22, 1995 [SE] Sweden .................................. 9500647

[51] Int. Cl.[7] ...................................................... H01S 3/30
[52] U.S. Cl. ................................................................ 372/6
[58] Field of Search ................................................... 372/6

[56] References Cited

U.S. PATENT DOCUMENTS 5,039,199  8/1991  Mollenauer et al. .................... 359/334
5,748,364  5/1998  Meli et al. .................................. 372/6

FOREIGN PATENT DOCUMENTS

| 0392493 | 4/1990 | European Pat. Off. . |
| 0392493 A1 | 10/1990 | European Pat. Off. . |
| 0408394 A1 | 1/1991 | European Pat. Off. . |
| WO 9209150 A1 | 5/1992 | WIPO . |

*Primary Examiner*—Rodney Bovernick
*Assistant Examiner*—Robert E. Wise
*Attorney, Agent, or Firm*—Oblon, Spivak, McClelland, Maier & Neustadt, P.C.

[57] ABSTRACT

An attenuation-free optical connection which includes a fiber optical signal fiber for transmission of an effective signal. Amplification elements are placed at intervals along the signal fiber for amplification of the effective signal and compensation for the signal fiber intrinsic attenuation. A drive element is common for the amplification elements which include a length of doped fiber which is fed via a feeding fiber by means of a ray distributor and a coupler. The drive element includes a pump station with one or more pump lasers for feeding of one or more signal fibres. Thanks to the passive amplification elements an attenuation-free connection with a minimal noise contribution is obtained.

10 Claims, 2 Drawing Sheets

ATTENUATION-FREE OPTICAL CONNECTION

BACKGROUND OF THE INVENTION

1. Field of the Invention

The present invention relates to a device at an optical communications network which supplies a virtual attenuation-free optical connection by utilizing a driver laser which transmits an optical pump signal which activates amplifying elements which are placed along a signal line. The amplifying elements give an essentially noiseless amplification by utilizing a doped fibre, and by that a compensation of the in the signal line intrinsic attenuation is obtained in a way that a virtually attenuation-free optical connection is obtained.

2. Discussion of the Background

A problem at transmission of optical signals in an optical communications network is that often too much noise is obtained from the big and besides sparsely located signal amplifiers. This results in a restricted transmission capacity at the transmission of optical signals and also requires a complex and expensive terminal equipment both on the amplifier side and the receiver side.

A technology which is used today is to place fibre optical amplifiers with high amplification in special pump stations at certain points along the signal fibre. The pump stations contains the pump laser and an active fibre in the same place. The amplifiers are placed comparatively sparsely, usually at a distance of 50–100 km. The high amplification results in that the amplifiers produce much noise and that they must be specially equipped with isolators, filters etc to avoid disturbances like self-oscillations and saturation. It is too expensive to place these amplifiers close, because of installation costs and supervision and maintenance. U.S. Pat. No. 5,115,338 describes a system of this type. Also U.S. Pat. No. 4,699,452 describes a similar system which utilizes the Raman principle instead of doped fibre as amplifying element.

The big noise contribution from the amplifiers results in that the optical transmitter laser must produce high output power, often via a special transmitter booster. High power levels results in that the fibre becomes unlinear as signal carrier. Such an unlinear transmission channel leads to strong restrictions of the range, how high data rates that can be used, and the number of optical channels which can be transmitted in the signal fibre at the same time.

Another method is to distribute the amplification along the signal fibre by applying doped fibres at points along the signal fibre and in this way reduce the noise contributions. At this the power of the pump laser is driven directly into one end of the signal fibre. The high pump power which is required, results in further problems with unlinear transmission, as in the case above. An example of this method is described in U.S. Pat. No. 5,039,199.

A similar method is to make the whole signal fibre as a low-doped fibre. This method is however impaired by the same problem. An example of this method is given in U.S. Pat. No. 5,058,974 and a combination of these methods is given in EP 0 408 394.

EP 0 387 075 shows that a doped fibre can be used in optical transmitters as an alternative to the semiconductor laser. The document shows a way to more efficiently utilize the pump power necessary to drive the doped fibre.

U.S. Pat. No. 4,546,476 describes a fibre optical amplifier where the coupler and the active fibre are arranged as one component.

SUMMARY OF THE INVENTION

The present invention solves the problems of the previously known technology by placing passive amplifying elements at regular intervals along the signal fibre. The amplifying elements are fed via a feeding fibre by a common pump laser. This makes the signal fibre attenuation-free and gives minimal noise contribution.

The present invention consequently supplies an attenuation-free optical connection comprising a fibre optical signal fibre for transmission of an effective signal. According to the invention amplifying elements are placed at intervals along the signal fibre for amplification of the effective signal and compensation for the in the signal fibre intrinsic attenuation. A drive element is in common for the amplification elements for the driving of these. Each amplification element includes preferably a lenght of doped fibre which is fed via a feeding fibre by means of a ray distributor and a coupler. The drive element includes a pump station with one ore more pump lasers for supplying of one or more signal fibres.

The invention is defined in details in the enclosed patent claims.

BRIEF DESCRIPTION OF THE DRAWINGS

The invention will now be described in details with reference to enclosed drawings where.

DETAILED DESCRIPTION OF PREFERRED EMBODIMENTS

The invention is based on the principle of amplifying an optical signal in a fibre by introducing a bit of doped fibre. By introducing a pump signal in the fibre the doped fibre amplifies the optical, effective signal in the signal fibre making the attenuation in the signal fibre being compensated for.

Figure 1:
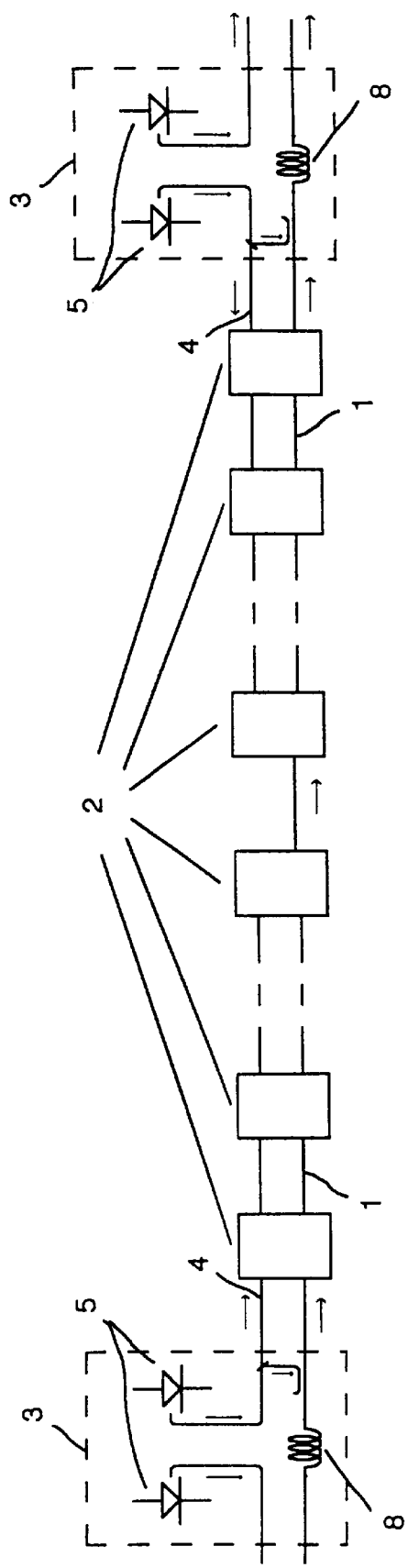
FIG. 1 is a block diagram over an attenuation-free optical connection according to the invention.

In FIG. 1 is show n an embodiment of the present invention. The optical connection includes an optical fibre 1, here called the signal fibre, for transmission of the effective signal. Along the signal fibre 1, a number of amplifying elements 2 are placed. The distance between the amplifying elements is a few kilometres. The amplifying elements are driven by a pump station 3 which provides the amplifying elements with optical power via a feeding fibre 4. The signal fibre 1 and the feeding fibre 4 are preferably parts of a common fibre cable. In the pump station there are one or more pump lasers 5. The optical power from the pump lasers is transmitted into the feeding fibre 4. At each amplifying element a fraction of the power in the feeding fibre is drawn off to the amplifying element via a ray distributor.

Figure 2:
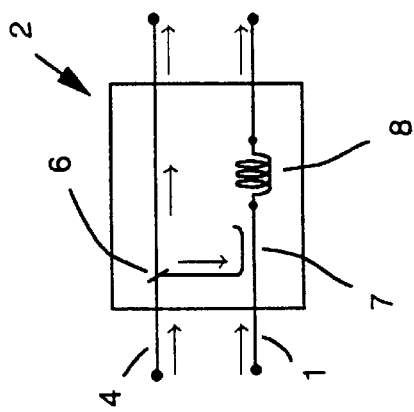
FIG. 2 is a diagram over an amplifying element in details.

In FIG. 2 the amplifying element is shown. It consists of passive optical components: a ray distributor 6, a coupler 7, and a doped fibre 8. The drawn pump power is via the coupler 7 brought to the signal fibre 1 and is made to act on the specially doped, signal amplifying fibre 8, which is spliced into the signal fibre 1. The pump power excites the doping ions in the signal amplifying fibre 8 which results in that these amplify the optical effective signal. The length of the signal amplifying fibre 8 is typically about a meter.

All the amplifying elements 2 can be of the same kind. The part of the pump power which the ray distributor 5 drains depends on how many separations that shall be made from the pump station.

In the solution according to FIG. 1 the pump power is reduced on one hand due to losses in the feeding fibre and on the other due to the used power in the coupler 7. The ray distributor 6 consequently shall make use of different size of the power which is fed to the amplifying element depending on where in the chain it is located.

The amplifying elements according to the presented invention in FIG. 2 consequently implies that the amplifying elements are different in so far that the ray parts shall draw different large parts of the available power.

Figure 3:
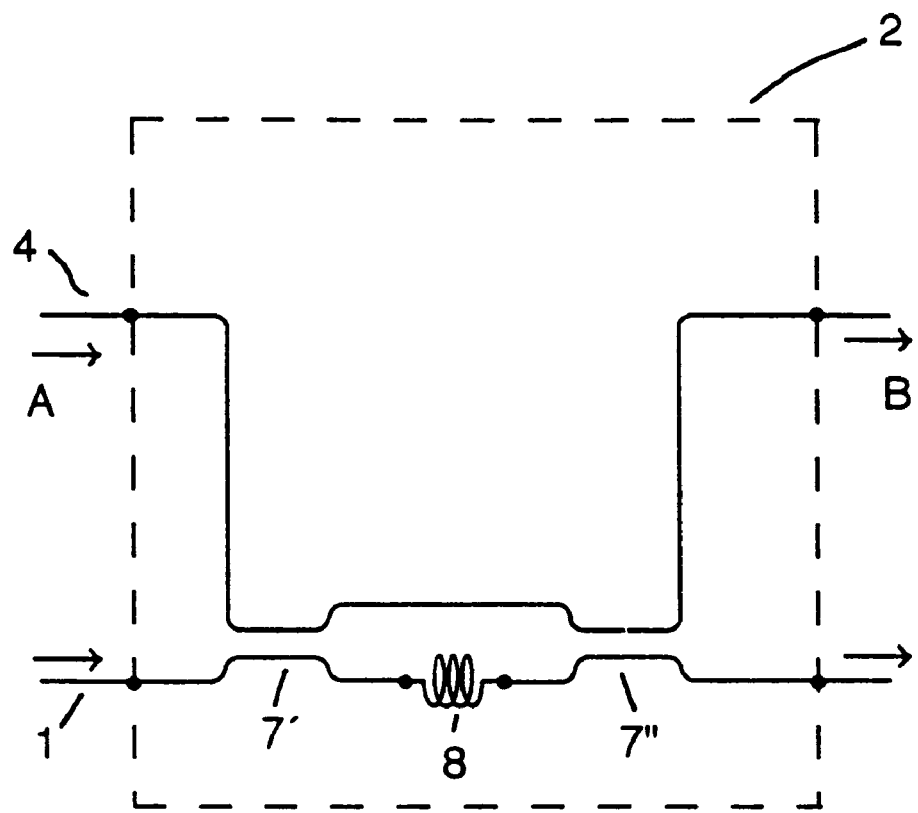
FIG. 3 is a diagram over an alternative amplifying element in details.

An alternative construction of the amplifying elements is shown in FIG. 3. The effective signal and the optical power is introduced from the left in the figure. The optical signal is transferred from the pump station in the cable 4 to the coupler 7'. In the coupler 7' the optical power is transferred to the signal fibre 1. The transferred pump power in the fibre 1 is after that active in the specially doped signal amplifying fibre 8 which as previously is spliced in the signal fibre 1. The pump power excites the doping ions in the signal amplifying fibre 8 which results in that these amplify the optical, effective signal. The length of the signal amplifying fibre 8 is for instance about a meter.

The signal is after that brought to a second coupler 7". In the coupler 7" that part of the pump power which is not used in the feeding fibre is brought back. The amplified effective signal is after that forwarded out into the signal fibre to the next amplifying element or receiver. The pump power which remains is also forwarded into the feeding fibre to the next amplifying element. At the next amplifying element the feeding fibre, however, beside the used power in the first amplifying element 2 will also lose some power at the transmission in the fibre. Amplification in the following amplifying element is however made in a corresponding way as has recently been described. In the solution according to FIG. 3 all amplifying elements can be identically designed. No consideration need in this case to be taken to the fact that the optical power is reduced through drainage in the amplifying elements and through losses in the feeding fibre 4.

As is indicated in FIG. 1 the pump station 3 also can provide a number of signal fibres with pump power by ray distribution in the pump station or by different pump lasers. It is convenient that an amplifying element is placed in the pump station 3 itself, as is shown with the doped fibre 8' in FIG. 1.

It is first of all the intention that the amplifying elements 2 should be placed at the same distance between them along the signal fibre 1, and the drained pump power be adjusted in a way that the attentuation in the signal fibre 1 is just compensated. Another variant is to have a somewhat higher amplification making the connection slowly amplifying the optical signal as this is travelling along the fibre cable.

The present invention consequently solves the problem at an attenuation-free optical connection and has more advantages compared with the previously known technology. The fibre cable becomes attenuation-free and gives minimal noise contribution. This results in that one can reduce the transmission power with 20–30 dB (100–1000 times,). One then has at least a margin of 20 dB to the threshold where unlinearity starts to appear.

Elimination of unlinearity results in that one can use dispersion shifted fibre as signal fibre. One then evades complex installations for dispersion compensation.

No filters or isolators are needed, which makes the fibre cable transparent in both directions.

One no longer has need for high power in the transmitter equipment. This results in strongly changed conditions for construction and optimization of optical high capacity systems.

With the present invention the optical transmission equipment can be simplified and becomes cheaper.

Solely passive optical components result in simple, robust and cheap implementation.

The distance between pump stations can be increased compared with the case where optical amplifiers at certain points are used.

Signal format, data rate, wavelenghts etc can be changed also after installation of the optical cable.

Further embodiments of the invention are evident for any person with expert knowlewdge. The invention is only restricted by the following patent claims.

I claim:

1. An attenuation-free optical connection system, comprising:
    an optical fiber configured to transmit an optical signal therethrough;
    a feeding fiber configured to transmit optical power;
    a plurality of amplification elements disposed along said optical fiber and said feeding fiber; and
    a drive element coupled to said plurality of amplification elements via said feeding fiber, and configured to supply power to said plurality of amplification elements, wherein
    each of said plurality of amplification elements is configured to amplify said optical signal using a predetermined portion of said power supplied by said drive element dependent on respective distance from said drive element along said feeding fiber, and thereby to compensate for an intrinsic attenuation of the optical signal imparted by the optical fiber.

2. The optical attenuation-free optical connection system of claim 1, wherein:
    said plurality of amplification elements each include a predetermined length of doped fiber being fed from said feeding fiber that is fed from a ray distributor and coupling to respective of said first amplification element and said second amplification element by a coupler.

3. The optical attenuation-free optical connection system of claim 2, wherein:
    the drive element includes a pump station having at least one pump configured to feed at least the optical fiber.

4. The optical attenuation-free optical connection system of claim 1, wherein:
    said plurality of amplification elements each include a predetermined length of doped fiber having connected on one end thereof a first coupler and a second coupler on the other end.

5. The optical attenuation-free optical connection system of claim 4, wherein:
    said feeding fiber couples power to each respective amplification element via at least one of the first coupler and the second coupler to the predetermined length of doped fiber so as to amplify the optical signal in the predetermined length of doped fiber using respective predetermined portion of said power.

6. The optical attenuation-free optical connection system of claim 4, wherein:

the drive element includes a pump station having at least one pump configured to feed at least the optical fiber.

7. The optical attenuation-free optical connection system of claim 5, wherein:
   said feeding fiber is configured to couple the power to said first coupler; and
   a residual portion of said power that is not used to amplify the optical signal in the predetermined length of doped fiber is fed back to said feeding fiber by said second coupler.

8. The optical attenuation-free optical connection system of claim 1, wherein:
   said drive element comprises a third amplification element.

9. The optical attenuation-free optical connection system of claim 1, wherein:
   each of said plurality of amplification elements is disposed at regular intervals along said optical fiber, and is configured to output substantially equal amounts of power.

10. The optical attenuation-free optical connection system of claim 1, wherein:
   said plurality of amplification elements each include at least a meter of doped fiber; and
   each amplification element is separated from a neighboring amplification element by at least a kilometer in length.

* * * * *